F. C. Jones,
Miter Box.
No. 103,341.    Patented May 24, 1870.
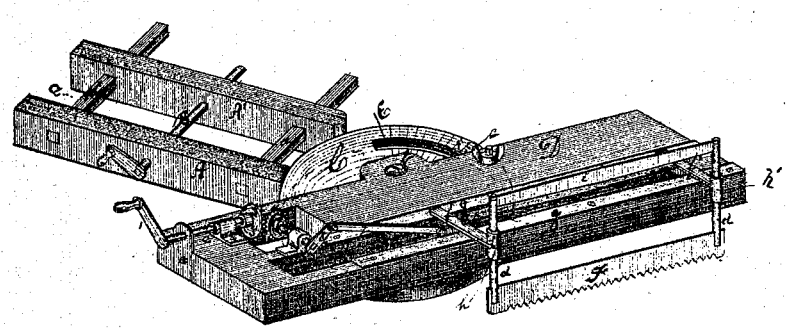
Witnesses:　　　　　　　　　　　　　　Inventor:
H. N. Jenkins.
Rufus R. Rhodes　　　　　　　　　　　F. C. Jones

United States Patent Office.

FRANCIS CARTER JONES, OF OUACHITA PARISH, LOUISIANA.

Letters Patent No. 103,341, dated May 24, 1870.

IMPROVEMENT IN MITER-MACHINE.

The Schedule referred to in these Letters Patent and making part of the same.

I, FRANCIS CARTER JONES, of the Parish of Ouachita, in the State of Louisiana, have invented a certain Improved Apparatus or Machine for Sawing bevel and right-angle Lines, of which the following is a specification.

My invention relates to a means for sawing timber either straight across, or at any required angle to its axis or length, without previously marking the same, and without the fatigue that is incident to sawing by hand, in the ordinary way, whatever may be the position of the stick of timber to be sawed; and It may be said, in general terms, to consist of an adjustable clamp, to secure the apparatus to the timber to be sawed, a dial or indicating-plate, on which lines are inscribed for adjusting the saw on the line required, and a rotating frame that is pivoted to the center of the dial-plate which carries the saw, and the guides, and gearing for the same, as well as a crank, to give motion to the saw through the agency of the gearing, &c.

The especial object designed to be accomplished by my invention is to make it easy and practicable to saw off the upper ends of piles for railroad-tressels, for bridges, wharves, and the like, whatever may be the use to which they are to be put, either on an exact horizontal line, or at any angle thereto that the exigency of the occasion may require, or to make tenons on the tops of such piles, after they have been driven into the ground, neither of which objects can now be attained with anything like accuracy, nor without great expense, because of the fact that there is no existing mode of doing it except by hand, which necessarily entails on the operator so constrained and fatiguing a position whilst he is sawing, that it is alike impossible for him to control the saw, so as to keep it upon any given line, or to continue the work, without frequent resting spells. This will be at once understood when it is remembered that, as a general thing, the man who saws off the tops of piles must stand on a ladder or some other equally inconvenient support in order to do it, and that the position of his arm while driving the saw is about the most awkward to which it can be subjected.

But, whilst the above is the primary object of my invention, it may be applied to the sawing of timber in workshops, and everywhere, no matter what position it may occupy, with large economic results.

A reference to the accompanying drawing will very quickly disclose the nature of my invention, its simplicity and importance.

A A' are the two sides of a strong clamp, A' being supported on the two arms $a a'$, which are strongly secured to A, in such manner that it may be moved on said arms by means of a clamping-screw bolt, B, and be made thereby to clamp the apparatus fast to any piece of timber at any point along the length of the same where it is to be cut by the saw, either to a given point for the formation of a tenon, or entirely across.

The part A of the clamp extends sufficiently beyond the part A', at one of its ends, to be secured firmly to a circular disk or plate, C, by any suitable means, substantially as shown on the drawing. This disk is inscribed with lines, as shown, one of which is at right angles to the axis of the clamp, and the others at angles gradually widening therefrom, as shown. These lines are marked by proper figures, to indicate the angle occupied by each, as, for example, 5°, 10°, and so on.

A central aperture through the disk C affords a means for securing upon it a frame, D, through the agency of a pin or bolt, $b$, whilst a segmental or curved slot, E, and a clamping thumb-screw, $c$, constitute a means for holding the frame D firmly in any given position on the said disk.

The frame D is just wide enough to extend over the edge of the disk C sufficiently to permit a crosscut saw, F, with its frame or handles, $d$, to move freely without touching the disk in the operation of the machine, substantially as shown.

Near the outside of the frame D, a longitudinal opening, G, is provided, on the sides of which slides $g$ are secured, as shown.

Jaws $f f'$, which are so constructed as to extend over the side of the frame D, and to terminate in vertical sleeve-recipients, $h h'$, for the handles $d$ of the saw, are fitted on the slides $g$, and kept in parallel relation to each other by means of a connecting-bar $h''$. The diameters of the sleeves $h h'$ being especially adjusted with reference to the size of the handles $d d$, effectually prevent any wabbling of the latter, whilst yet permitting them to move easily in an endwise direction.

An adjustable and removable bar, $i$, holds the upper or outer ends of the handles $d$ steadily in position, and, at the same time, affords a means by which the operator may gently press on the saw with his left hand, whenever a pressure is requisite to make it take, as must always be the case when the saw occupies a horizontal position with respect to the plane of its blade.

Motion is imparted to the saw by means of a crank, 1, a shaft, 2, bevel pinions 3 and 4, a shaft, 5, a crank, 6, and a pitman, 7, arranged and secured on the frame D, substantially as shown on the drawings.

In the practical application of my invention to use, the clamp is put on the stick of timber to be sawed, so as to bring the saw on the line at which it is to be cut, and then firmly fastened thereon by means of the screw-bolt B. The saw is then adjusted by means of the lines on the indicating-disk C, on whatever line the cut is to be made, and is firmly fixed on that line by means of the thumb-screw c. The operator has now only to turn the crank 1 to put the saw in motion, and cut the stick, either entirely through, or to any given point, at his pleasure. If the stick of timber occupy a vertical position or an upright one, although not exactly vertical, it will be necessary to press slightly on the bar i to make it cut, but in all positions where the weight of the saw falls in the direction of the cut, no pressure is needed. The pressure can be applied with the left hand, whilst the crank is turned with the right.

My apparatus may be made of any size, and may, hence, be used to saw timber of the largest size equally as of the smallest.

What I claim is—

A clamp, consisting of the side pieces A A', cross-bars a a', and screw-bolt B, in combination with the indicating-disk C, the frame D, when the latter is mounted with a cross-cut saw, F, and its adjuncts, as herein specified, and the said saw is driven by the gearing consisting of the parts 1 2 3 4 5 6 7, and all the parts are constructed, arranged with respect to each other, and operate as herein described, for the purpose set forth.

F. C. JONES.

Witnesses:
RUFUS R. RHODES.
EMILE H. LEVY.